(12) United States Patent
Heo et al.

(10) Patent No.: US 7,631,112 B2
(45) Date of Patent: Dec. 8, 2009

(54) DETERMINING STORAGE DEVICE CONNECTION INFORMATION FOR SERIAL AND PARALLEL COMPUTER INTERFACES TO STORAGE DEVICES

(75) Inventors: Seok-Won Heo, Seoul (KR); Sung-Ho Park, Seoul (KR); Sam-Yong Bahng, Gyeonggi-do (KR); Si-Yung Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 305 days.

(21) Appl. No.: 11/701,647

(22) Filed: Feb. 2, 2007

(65) Prior Publication Data
US 2007/0234027 A1 Oct. 4, 2007

(30) Foreign Application Priority Data
Feb. 17, 2006 (KR) .................. 10-2006-0015823

(51) Int. Cl.
G06F 3/00 (2006.01)
G06F 9/00 (2006.01)
(52) U.S. Cl. .................. 710/16; 710/17; 710/18; 710/19; 713/1; 713/2; 713/100
(58) Field of Classification Search .................. None
See application file for complete search history.

(56) References Cited

U.S. PATENT DOCUMENTS

| 6,016,402 A | 1/2000 | Thomas et al. |
| 6,754,793 B2 | 6/2004 | Piwonka et al. |
| 7,225,290 B2 | 5/2007 | Barth et al. |
| 2003/0191872 A1* | 10/2003 | Barth et al. ............ 710/8 |
| 2004/0044802 A1* | 3/2004 | Chiang et al. .......... 710/1 |
| 2005/0086459 A1 | 4/2005 | Cho et al. |
| 2005/0120170 A1 | 6/2005 | Zhu |

FOREIGN PATENT DOCUMENTS

| DE | 102 14 701 A1 | 10/2004 |
| JP | 2005-166097 | 6/2005 |

OTHER PUBLICATIONS

Office Action, German Patent Application No. 10 2007 009 300.6, Jul. 24, 2008.

* cited by examiner

Primary Examiner—Alan Chen
(74) Attorney, Agent, or Firm—Myers Bigel Sibley & Sajovec, P.A.

(57) ABSTRACT

Computer systems and related methods are provided for managing connections to storage devices. The computer system includes a connector and a register. The connector includes a plurality of pins configured to be removably connected to a first storage device and to a second storage device. A first pin of the connector carries a signal that indicates when the connector is connected to the first storage device, and a second pin carries a signal that indicates when the connector is connected to the second storage device. The register stores connection information that indicates whether the first storage device and/or the second storage device are connected to the connector.

15 Claims, 3 Drawing Sheets

DETERMINING STORAGE DEVICE CONNECTION INFORMATION FOR SERIAL AND PARALLEL COMPUTER INTERFACES TO STORAGE DEVICES

CROSS-REFERENCE TO RELATED APPLICATIONS

This U.S. non-provisional patent application claims priority under 35 U.S.C. § 119 of Korean Patent Application No. 2006-15823, filed on Feb. 17, 2006, the entire contents of which are hereby incorporated by reference.

BACKGROUND OF THE INVENTION

The present invention relates to computer systems, and more particularly to interfaces between computers and data storage devices.

In computer systems, computers store and/or retrieve data to/from data storage devices, such as hard disk drives, CD or DVD drives, zip drives, and other high/low-capacity storage devices, through various types of interfaces which can have different physical and/or logical operational requirements. One such interface which has become more common in computer systems is the integrated drive electronics (IDE) interface. The IDE interface is also commonly referred to as an advanced technology attachment (ATA) interface.

One type of ATA interface, known as a parallel-ATA interface, transmits data in parallel and has a maximum data transfer speed of 133 MB/s. Another ATA interface is the serial-ATA interface which can support a greater maximum data transfer speed of 150 MB/s.

Generally, a main logic board in a computer includes connectors and controllers that may support the parallel-ATA and serial-ATA interfaces so as to provide flexibility to a user who can interface the computer to parallel-ATA and/or serial-ATA data storage devices. When a user connects storage devices to the parallel-ATA interface and/or to the serial-ATA interface, it may be necessary for a user to define, via a setup menu, certain storage device information in a complementary metal oxide semiconductor (CMOS) RAM which is used during booting operations of the storage devices. Unfortunately, some users may not be sufficiently familiar with the computer to be able to correctly use the setup menu to define storage device information in the CMOS RAM which may be needed to allow normal booting operation of the storage devices.

SUMMARY OF THE INVENTION

Some embodiments of the present invention are directed to computer systems and related methods that automatically set the connection information for storage devices without necessitating intervention of a user.

In some embodiments, the computer system includes at least one connector and a register. The connector includes a plurality of pins configured to be removably connected to a first storage device and to a second storage device. A first pin of the connector carries a signal that indicates when the connector is connected to the first storage device, and a second pin carries a signal that indicates when the connector is connected to the second storage device. The register stores connection information that indicates whether the first storage device and/or the second storage device are connected to the connector.

The computer system may further include a basic input/output system (BIOS) ROM storing a BIOS code, a CMOS RAM, and a processor. The CMOS RAM stores user-definable device information that indicates whether the first storage device and/or the second storage device are connected to the connector. The processor carries out a power-on self-test (POST) according to the BIOS code in the BIOS ROM, and stores the connection information, indicating whether the first storage device and/or the second storage device are connected to the connector, from the register into the CMOS RAM when the user-definable connection information for the first storage device and/or the second storage device is different from the connection information in the register.

The connector may be configured to connect to a parallel-ATA first storage device, and to connect to a serial-ATA second storage device. The computer system may further include a south bridge and a north bridge. The south bridge includes a parallel-ATA controller configured to connect to the parallel-ATA first storage device through the connector, and a serial-ATA controller configured to connect to the serial-ATA second storage device through the connector. The north bridge interconnects the south bridge to the processor.

The computer system may further include a clock generator that generates a first clock supplied to the parallel-ATA controller and a second clock supplied to the serial-ATA controller. The processor controls the clock generator to selectively provide the first clock to the parallel-ATA controller in response to whether the connection information in the register indicates that the parallel-ATA storage device is connected to the connector, and controls the clock generator to selectively provide the second clock signal to the serial-ATA controller in response to whether the connection information in the register indicates that the serial-ATA storage device is connected to the connector.

The connection information in the register can indicate that one of the parallel-ATA storage device and the serial-ATA storage device, which are connected to the connector, is a master device and the other one is a slave device. The BIOS ROM further includes a boot file search program that is executed by the processor to search the master device for a boot file, and that stores in the user-definable connection information in the CMOS RAM further information that indicates which of the parallel-ATA storage device and the serial-ATA storage device is the master device.

Other embodiments of the present invention are directed to methods for operating a computer system having a CMOS RAM and at least one connector that is connectable to a first storage device and to a second storage device. A determination is made as to whether the first storage device and/or the second storage device are connected to the connector and to generate connection information indicative thereof. A power-on self-test is carried out to determine whether user-definable connection information in the CMOS RAM, which indicates whether the first storage device and/or the second storage device is connected to the connector, agrees with the determined first connection information for the first and second storage devices. The determined first connection information for the first storage device and/or the second storage device is written to the CMOS RAM when the determined first connection information does not agree with the user-definable connection information in the CMOS RAM.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Figure 1:
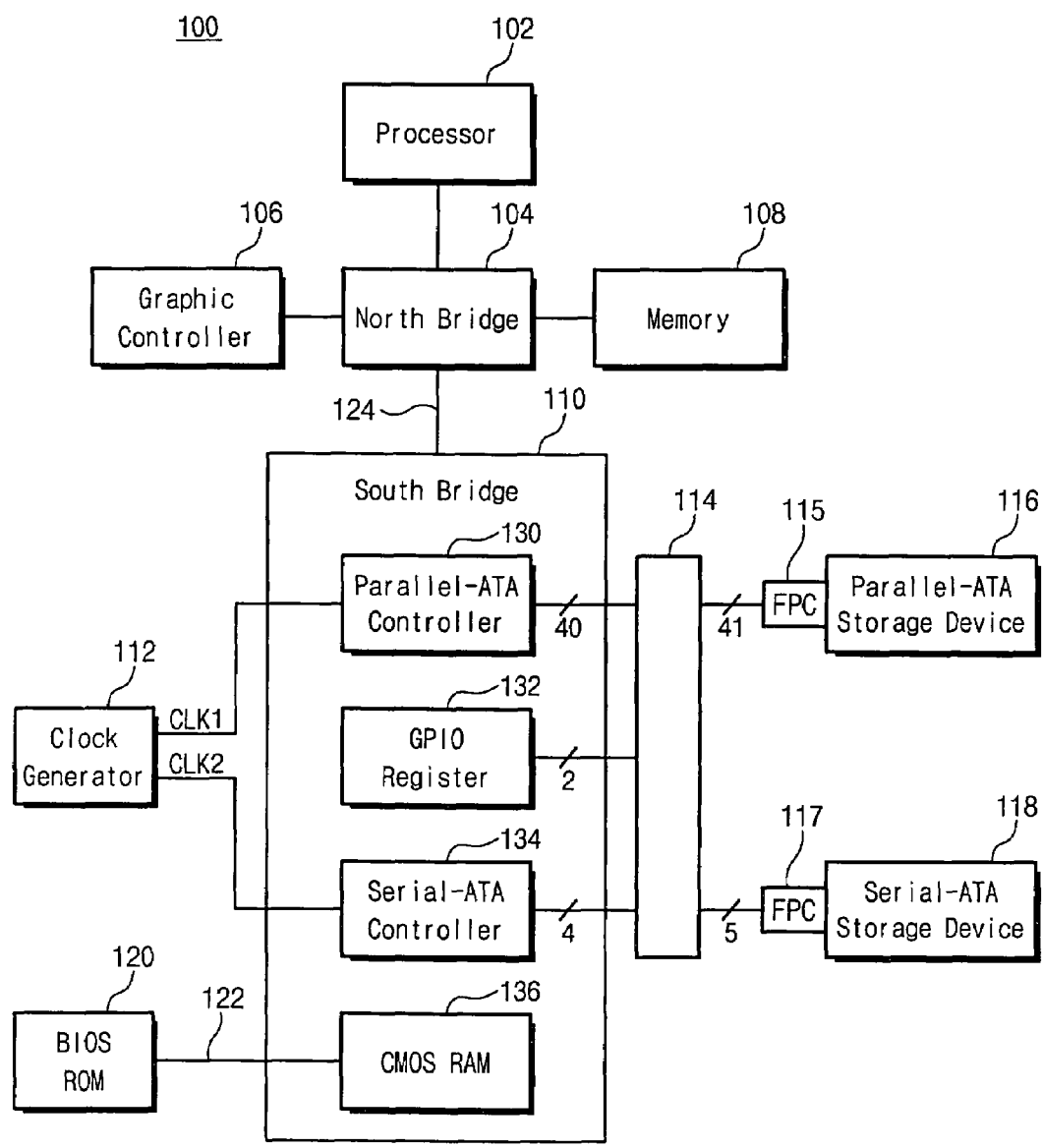
FIG. 1 is a block diagram of a computer system according to some embodiments of the present invention.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" and "/" includes any and all combinations of one or more of the associated listed items.

It will be understood that when an element is referred to as being "on", "connected to", "coupled to", or "adjacent to" another element, it can be directly on, connected, coupled, or adjacent to the other element, or intervening elements may be present. In contrast, when an element is referred to as being "directly on," "directly connected to", "directly coupled to", or "immediately adjacent to" another element, there are no intervening elements present.

FIG. 1 is a block diagram of a computer system 100 according to some embodiments of the present invention. The computer system 100 includes a processor 102, i.e., a central processing unit, a north bridge 104, a graphic controller 106, a main memory 108, a south bridge 110, a clock generator 112, a connector 114, a parallel-ATA storage device 116 and a serial-ATA storage device 118 that are respectively connected through connectors 115 and 117, buses 122 and 124, a basic input/output system (BIOS) ROM 120, and a battery or other power supply. The functionality of the north bridge 104 and the south bridge 110 can be integrated in one or more chips or can be separated into independent chips. The computer system 100 may include other devices such as a cache memory, a modem, a parallel interface, serial interface, a small computer system interface (SCSI), a network interface card, and various buses and/or sub-systems.

The processor 102 is connected to the north bridge 104. The north bridge 104 interconnects the graphic controller 106, the memory 108, and a peripheral component interconnect (PCI) bus 124. The south bridge 110 interconnects the PCI bus 124, peripheral devices, integrated devices and sub-systems. The battery or other power supply can be connected to the south bridge 110.

The north bridge 104 interconnects the processor 102, the graphic controller 106, the memory 108, and devices connected to a PCI bus 124 which include the devices connected to the south bridge 110. Generally, a PCI slot (not shown) may be included to connect removable peripheral devices to the computer system 100.

The south bridge 110 interconnects the PCI bus 124 to various devices and sub-systems therein. The various devices connected to the south bridge 110 can include a modem, a printer, a keyboard, and/or a mouse, which are connected to the computer system 100 through a low pin count (LPC) bus 122 and/or another bus such as an X-bus or an industry standard architecture (ISA) bus. The south bridge 110 can include a parallel-ATA controller 130 and a serial-ATA controller 134. The parallel-ATA controller 130 and the serial-ATA controller 134 interconnect a parallel-ATA storage device 116 and a serial-ATA storage device 118, respectively, to the rest of the computer system using a connecter 114. Although the connector 114 is illustrated as a single block, it is to be understood that it may be physically implemented as one or more physical connectors each have groups of conductive pins (i.e., parallel-ATA interface connector and separate serial-ATA interface connector). The parallel-ATA storage device 116 and the serial-ATA storage device 118 may include, but are not limited to, hard disk drive(s), CD/DVD drive(s), zip drive(s), CDRW driver(s), and/or other high/low-capacity storage devices.

The connector 114 includes 40 pins configured to transfer data between the parallel-ATA storage device 116 and the parallel-ATA controller 130, and a general purpose input/output (GPIO) pin that carries a signal that is indicative of when the parallel-ATA storage device 116 is connected to the connector 114. The connector 114 also includes 4 pins configured to transfer data between the serial-ATA storage device 118 and the serial-ATA controller 134, and another GPIO pin that carries a signal that is indicative of when the serial-ATA storage device 118 is connected to the connector 114. Therefore, the connector 114 can include 46 total pins (i.e., 44 data transfer pins interconnecting the controllers 130 and 134 and storage devices 116 and 118, and 2 GPIO pins). Although for purposes of explanation the connector 114 is described as having 40 data transfer pins for the parallel interface and 4 data transfer pins for the serial interface, it is to be understood that the number of pins can vary therefrom.

Flexible printed circuit (FPC) connectors 115 and 117 are configured to interconnect the storage devices 116 and 118 to the connector 114. When the storage devices 116 and 118 are connected to the respective FPC connectors 115 and 117 and connector 114, the respective GPIO terminals of the connector 114 are pulled-up (such as by circuitry in the bridge 110, the connector 114, and/or in the storage devices 116 and 118). In contrast, when the storage devices 116 and 118 are not connected to the respective FPC connectors 115 and 117 and connector 114, the respective GPIO terminals of the connector 114 are pulled-down. Accordingly, whether one or both of the GPIO terminals of the connector 114 are pulled-up/pulled-down is indicative of whether one or both of the storage devices 116 and 118 are connected to the connector 114.

The GPIO terminals of the connector 114 are connected to the GPIO register 132 in the south bridge 110. Depending on whether the storage devices 116 and 118 are connected to the connector 114, the GPIO register 132 is thereby set to logic values 00, 01, 10, or 11. Table 1 shows values in the GPIO register when the parallel-ATA storage device 116 and/or the serial-ATA storage device 118 are, or are not connected, to the connector 114.

TABLE 1

| Whether storage device is, or is not, connected | GPIO[1:0] |
|---|---|
| Parallel-ATA not connected Serial-ATA not connected | 00 |
| Parallel-ATA not connected Serial-ATA connected | 01 |
| Parallel-ATA connected Serial-ATA not connected | 10 |
| Parallel-ATA connected Serial-ATA connected | 11 |

Thus, in accordance with some embodiments, the GPIO register 132 in the south bridge 110 stores information that represents whether or not one or both of the parallel-ATA storage device 116 and the serial-ATA storage device 118 are connected to the computer system 100. When booting-up, the computer system 100 may accurately determine whether or not one or both of the storage devices 116 and 118 are connected to the south bridge 110, via the connector 114.

The south bridge 110 includes a CMOS RAM 136. The CMOS RAM 136 includes system configuration data. The system configuration data includes operational information for devices in the computer system 100, and other operational/environmental information for the computer system 100 such as, but not limited to, current date and/or time, whether or not a floppy disk drive is connected or not, boot drive information, hard disk drive information, and/or power management information. In accordance with some embodiments, the CMOS RAM 136 stores information that identifies whether or not the parallel-ATA storage device 116 and/or the serial-ATA storage device 118 are connected to the computer system 100, and identifies which one of the connected storage devices 116 and 118 is a master device in which one is a slave device. The CMOS RAM 136 can provide non-volatile storage for its data using power supplied from a battery or other uninterruptible power supply connected to the south bridge 110. The settings information stored in the CMOS RAM 136 can be defined/modified by the user through a BIOS setup menu.

The BIOS ROM 120 stores BIOS code which is internal software that controls test and operation of the computer system 100.

In accordance with some embodiments of the computer system 100, the BIOS code determines whether the system configuration information stored in the CMOS ROM 136, which indicates whether or not the storage devices 116 and 118 are connected to the south bridge 110, agrees with (e.g., is identical to) the corresponding connection information stored in the GPIO register 132. The BIOS code writes the connection information stored in the GPIO register 312 into the CMOS RAM 136 when the GPIO register 312 configuration information does not agree with (e.g., is not identical to) the CMOS RAM 136 connection information. Accordingly, when a user fails to set up, or incorrectly sets up, connection information related to the storage devices 116 and 118 via a BIOS setup menu, the computer system 100 automatically determines and sets up accurate connection information for the storage devices 116 and 118. Consequently, the computer system 100 can correctly boot up knowing the connection status of the storage devices 116 and 118.

When the parallel-ATA storage device 116 and the serial-ATA storage device 118 are connected to the computer system 100, one of the two storage devices 116 and 118 is set as a master device, and the other one is set as a slave device. The CMOS RAM 136 stores the master/slave information of the parallel-ATA storage device 116 and the serial-ATA storage device 118. This master/slave information may be modified by a user.

When the BIOS ROM 120 of the present invention includes a boot file search program that searches for a boot file that can be used to initialize at least a portion of an operating system. The processor 102 executes the boot file search program to search for the boot file in the storage devices 116 and 118, and to write master/slave information into the CMOS RAM 136 that indicates that one of the storage devices 116 and 118, which is found to contain the boot file, is a master device and the other one is a slave device.

A clock generator 112 generates clocks that control timing of the computer system 100. The clocks generated in the clock generator 112 include a first clock signal CLK1 for the parallel-ATA controller 130 and a second clock signal CLK2 for the serial-ATA storage device 134. The processor 102 controls the clock generator 112 to start/stop providing the first and second clock signals CLK1 and CLK2 to the parallel-ATA controller 130 and the serial-ATA storage device 134 in response to whether or not the parallel-ATA storage device 116 and the serial-ATA storage device 118 are connected, which control may be carried out during a process that initializes each device after power-on. Power consumption of the computer system 100 may thereby be reduced by not providing the first clock signal CLK1 when the storage device 116 is not connected to the parallel-ATA controller 130, and not providing the second clock signal CLK2 when the storage device 118 is not connected to the serial-ATA controller 134.

Figure 2:
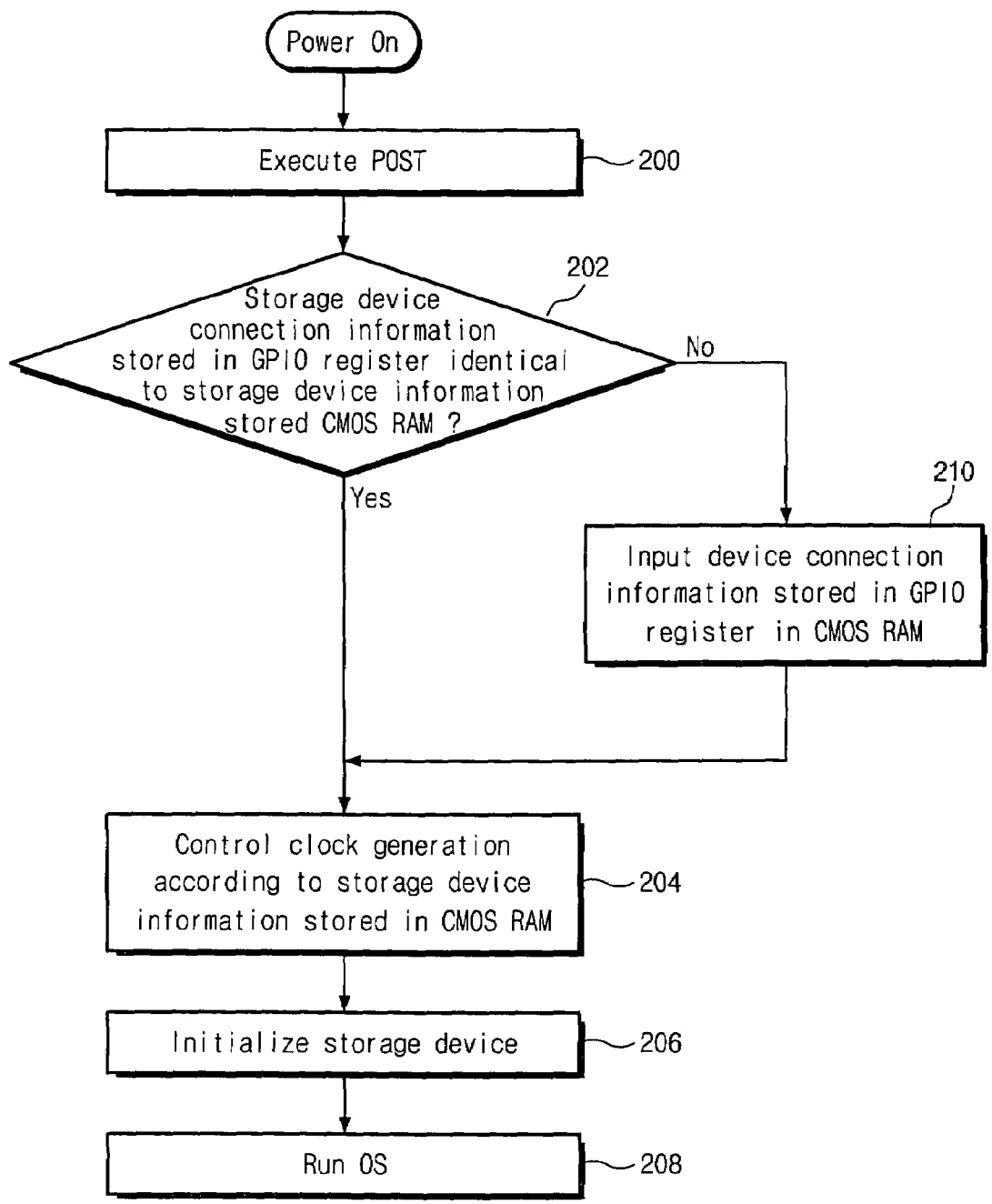
FIG. 2 is a flowchart illustrating methods for starting a computer system using a BIOS code stored in a BIOS ROM.

FIG. 2 is a flowchart that illustrates methods for starting a computer system using codes that are stored in a BIOS ROM. In operation S200, the processor 102 processes a BIOS code instruction stored in the BIOS ROM 120. The BIOS code processed by the processor 102 performs a power-on self-test (POST).

In operation S202, the BIOS code reads the connection information of the storage devices 116 and 118 stored in the GPIO register 132, and determines whether the connection information stored in the GPIO register 132 agrees with (e.g., is identical to) the connection information stored in the CMOS RAM 136. When the connection information does not agree (e.g., is not identical), it proceeds to operation S210. In operation S210, the BIOS code writes device connection information stored in the GPIO register 132 into the CMOS RAM 136, and then proceeds to operation S204. When the connection information is determined to agree in operation S202, operation S204 is carried out.

In operation S204, the BIOS code controls the clock generator 112 in response to the connection information for the storage devices 116 and 118 stored in the CMOS RAM 136. When the storage devices 116 and 118 are connected to the computer system 100, the BIOS code controls the clock generator 112 to generate the first and second clock signals CLK1 and CLK2. When one of the storage devices 116 and 118 are connected to the computer system 100, the BIOS code controls the clock generator 112 to generate a clock signal corresponding to the connected storage device.

In operation S206, the BIOS code initializes the parallel-ATA storage device 116 and/or the serial-ATA storage device 118, in response to their being connected to the computer system 100.

In operation S208, the BIOS code identifies a booting sector corresponding to a boot position of a boot data storage device. The boot position may be in a floppy disk drive, a hard disk drive, a CD ROM drive, and/or may be located in another bootable data storage device. Next, the BIOS code initiates a portion of an operating system by calling executable boot sector code from the boot position.

Figure 3:
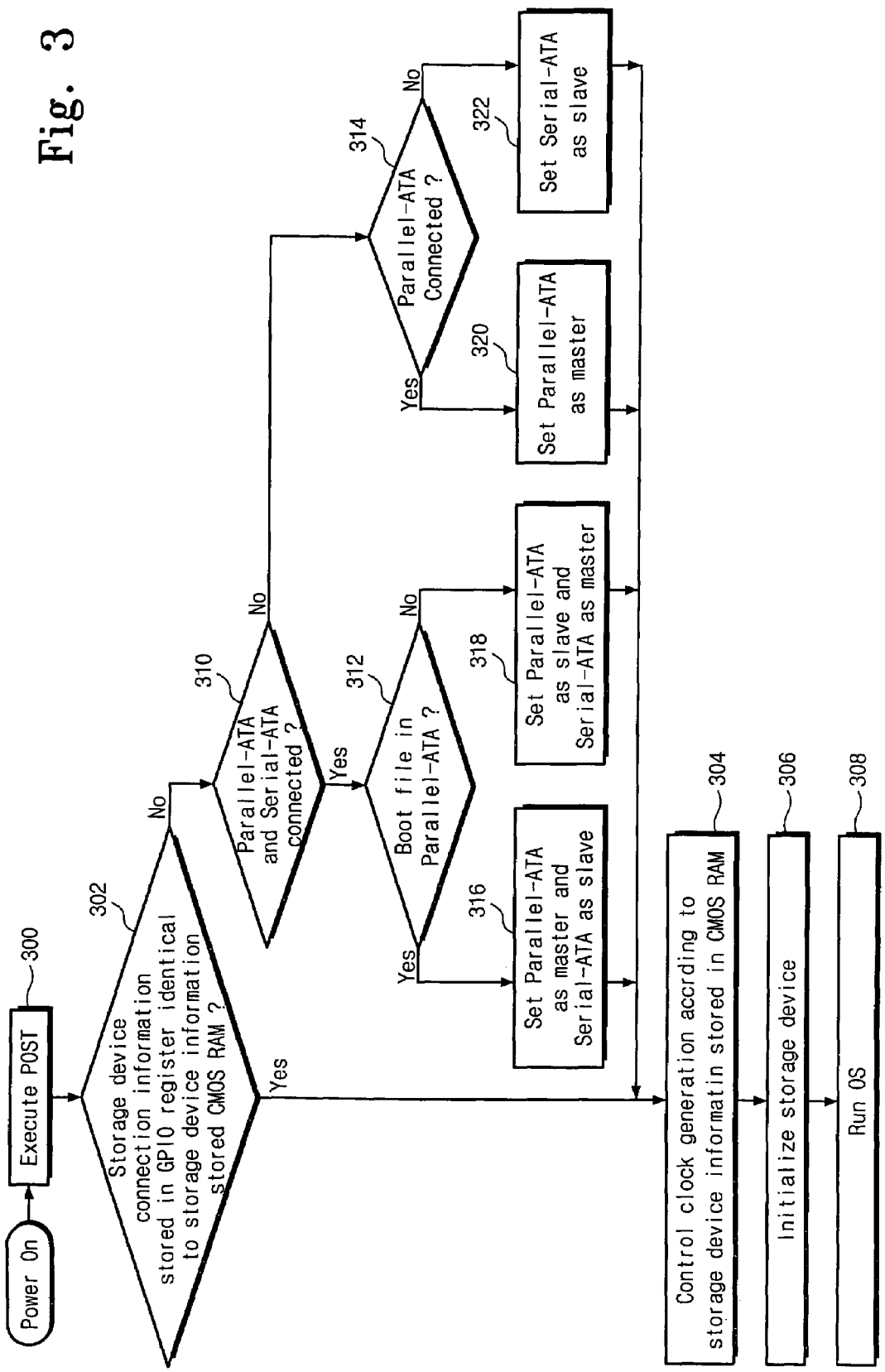
FIG. 3 is a flowchart illustrating methods for starting a computer system using a BIOS code when the BIOS code stored in a BIOS ROM includes a boot file search code.

FIG. 3 is a flowchart that illustrates methods for starting a computer system using a BIOS code when the BIOS code stored in a BIOS ROM includes a boot file search code. Referring to FIG. 3, the master/slave information of the parallel-ATA storage device 116 and the serial-ATA storage device 118, which are connected to the computer system 100, are automatically searched and then set up/defined in the CMOS RAM.

In operation S300, the processor 102 processes a BIOS code instruction stored in the BIOS ROM 120. The BIOS code, which is processed by the processor 102, performs a POST.

In operation S302, the BIOS code reads connection information of storage devices 116 and 118 stored in the GPIO register 132, and determines whether the connection information stored in the GPIO register 132 is identical to the connection information stored in the CMOS RAM 136. When the connection information is not identical, the method carries out operation S310. When the connection information is identical in operation S302, the method carries out operation S304.

In operation S310, the BIOS code determines whether the parallel-ATA storage device and the serial-ATA storage device 118 are connected to the computer system 100 in response to the connection information stored in the GPIO register 132. When the parallel-ATA storage device and the serial-ATA storage device 118 are connected to the computer system 100, the method proceeds to operation S312 and otherwise, the method proceeds to operation S314.

In operation S312, the BIOS code determines whether a boot file is in the parallel-ATA storage device 116. When the boot file is in the parallel-ATA storage device 116, information for setting the parallel-ATA storage device 116 as a master and the serial-ATA storage device 118 as a slave is written in the CMOS RAM 136 in operation S316. When the boot file is not in the parallel-ATA storage device 116, information for setting the parallel-ATA storage device 116 as a slave and the serial-ATA storage device 118 as a master is written to the CMOS RAM 136 in operation S316.

In operation S314, the BIOS code determines whether the parallel-ATA storage device 116 is connected to the computer system 100 in response to the connection information stored in the GPIO register 132. When the parallel-ATA storage device 116 is connected to the computer system 100, operation S320 sets information in the CMOS RAM 136 that defines the parallel-ATA storage device 116 as a master. When the parallel-ATA storage device 116 is not connected to the computer system 100, operation S322 writes information in the CMOS RAM 136 that sets the serial-ATA storage device 116 as a slave.

In operation S304, the BIOS code controls the clock generator 112 to generate first and second clock signals CLK1 and CLK2 in response to the storage device information stored in the CMOS RAM 136.

In operation S306, the BIOS code initializes the parallel-ATA storage device 116 and/or the serial-ATA storage device 118, when connected to the computer system 100, in response to the storage device information stored in the CMOS RAM 136.

In operation S308, the BIOS code initiates a portion of an operating system by calling a boot sector code in a master boot position that includes a boot file in the parallel-ATA storage device 116 and/or the serial-ATA storage device 118 to boot the computer system 100.

According to some embodiments of the present invention, when a user does not set up, or incorrectly sets up, connection information about storage devices in a BIOS setup menu, the computer system automatically searches for and sets up accurate connection information for storage devices so that the computer system can boot up correctly.

According to some embodiments of the present invention, in response to whether or not a parallel-ATA and/or a serial-ATA storage device are connected to a corresponding parallel-ATA controller and/or serial-ATA controller, a clock generator selectively provides/not provides clock signals to the associated parallel-ATA controller and/or serial-ATA controller to avoid generation of unnecessary clock signals and, thereby, reduce power consumption of the computer system.

Moreover, when the BIOS ROM includes a boot file search program, the BIOS code searches the boot file stored in the parallel-ATA storage device and/or the serial-ATA storage device to store the master/slave information of the storage devices in the CMOS RAM. Therefore, when a user does not set up accurate connection information about storage devices, the computer system may still boot up correctly using a connected storage device.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer system comprising:
   at least one connector comprising a plurality of pins configured to be removably connected to a first storage device and to a second storage device, wherein a first pin of the connector carries a signal that indicates when the connector is connected to the first storage device, and a second pin of the connector carries a signal that indicates when the connector is connected to the second storage device;
   a register that stores connection information that indicates whether the first storage device and/or the second storage device are connected to the connector;
   a basic input/output system (BIOS) ROM storing a BIOS code;
   a complementary metal oxide semiconductor (CMOS) RAM storing user-definable device information that indicates whether the first storage device and/or the second storage device are connected to the connector; and
   a processor configured to carry out a power-on self-test (POST) according to the BIOS code in the BIOS ROM, and to store the connection information, indicating whether the first storage device and/or the second storage device are connected to the connector, from the register into the CMOS RAM when the user-definable connection information for the first storage device and/or the second storage device is different from the connection information in the register.

2. The computer system of claim 1, wherein the connector is configured to connect to a parallel-advanced technology attachment (ATA) first storage device, and the connector is configured to connect to a serial-ATA second storage device.

3. The computer system of claim 2, further comprising:
a south bridge including a parallel-ATA controller configured to connect to the parallel-ATA first storage device through the connector, and a serial-ATA controller configured to connect to the serial-ATA second storage device through the connector; and
a north bridge that interconnects the south bridge to the processor.

4. The computer system of claim 3, wherein the register is disposed in the south bridge.

5. The computer system of claim 3, further comprising a clock generator that generates a first clock supplied to the parallel-ATA controller and a second clock supplied to the serial-ATA controller.

6. The computer system of claim 5, wherein the processor controls the clock generator to selectively provide the first clock to the parallel-ATA controller in response to whether the connection information in the register indicates that the parallel-ATA storage device is connected to the connector, and controls the clock generator to selectively provide the second clock to the serial-ATA controller in response to whether the connection information in the register indicates that the serial-ATA storage device is connected to the connector.

7. The computer system of claim 2, wherein the connection information in the register indicates that one of the parallel-ATA storage device and the serial-ATA storage device, which are connected to the connector, is a master device and the other one is a slave device.

8. The computer system of claim 7, wherein the BIOS ROM further comprises a boot file search program, and the processor executes the boot file search program to search the parallel-ATA storage device and/or the serial-ATA storage device for a boot file, and identifies as the master device in the user-definable connection information in the CMOS RAM one of the parallel-ATA storage device and the serial-ATA storage device that is found to contain the boot file.

9. A method for operating a computer system having a CMOS RAM and at least one connector that is connectable to a first storage device and to a second storage device, the method comprising:
determining whether the first storage device and/or the second storage device are connected to the connector and generating first connection information indicative thereof;
performing a power-on-self-test (POST) to determine whether user-definable connection information in the CMOS RAM, which indicates whether the first storage device and/or the second storage device is connected to the connector, agrees with the determined first connection information for the first and second storage devices; and
writing the determined first connection information for the first storage device and/or the second storage device to the CMOS RAM when the determined first connection information does not agree with the user-definable connection information in the CMOS RAM.

10. The method of claim 9, wherein the computer system comprises:
a first controller configured to connect to the first storage device through the connector;
a second controller configured to connect to the second storage device through the connector; and
a clock generator that generates a first clock supplied to the first controller and a second clock supplied to the second controller, and the method further comprising:
controlling the clock generator to selectively provide the first clock to the first controller in response to whether the connection information in the CMOS RAM indicates that the first storage device is connected to the connector; and
controlling the clock generator to selectively provide the second clock to the second controller in response to whether the connection information in the CMOS RAM indicates that the second storage device is connected to the connector.

11. The method of claim 9, further comprising initializing the first storage device when the connection information in the CMOS RAM indicates that the first storage device is connected to the connector, and initializing the second storage device when the connection information in the CMOS RAM indicates that the second storage device is connected to the connector.

12. The method of claim 9, further comprising:
searching for a boot file in the first and second storage devices when the connection information in the CMOS RAM indicates that the first and second storage devices are connected to the connector; and
writing information into the CMOS RAM that indicates which of the first and second storage devices is a master device in response to which of the first and second storage devices is found to contain the boot file.

13. The method of claim 12, further comprising writing information in the CMOS RAM that indicates that one of the first and second storage devices which is found to not contain the boot file is a slave device.

14. The method of claim 9, further comprising, when the determined first connection information indicates that only one of the first and second storage devices is connected to the connector, writing information into the CMOS RAM that indicates that the connected one of the first and second storage devices is a master device.

15. The method of claim 9, further comprising initiating at least a portion of an operation system by calling boot sector code in a boot file located in a connected one of the first and second storage devices.

* * * * *